(12) United States Patent
LeBeau

(10) Patent No.: US 12,022,201 B2
(45) Date of Patent: Jun. 25, 2024

(54) SMART ILLUMINATION FOR NIGHTVISION USING SEMI-TRANSPARENT DETECTOR ARRAY

(71) Applicant: L3Harris Technologies, Inc., Melbourne, FL (US)

(72) Inventor: James A. LeBeau, Tempe, AZ (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 107 days.

(21) Appl. No.: 17/702,684

(22) Filed: Mar. 23, 2022

(65) Prior Publication Data

US 2023/0308767 A1    Sep. 28, 2023

(51) Int. Cl.
| | |
|---|---|
| *H04N 23/72* | (2023.01) |
| *G01S 17/08* | (2006.01) |
| *G06F 3/01* | (2006.01) |
| *G06T 7/13* | (2017.01) |
| *G06V 10/141* | (2022.01) |
| *G06V 10/25* | (2022.01) |
| *H04N 23/71* | (2023.01) |

(52) U.S. Cl.
CPC ............ *H04N 23/72* (2023.01); *G01S 17/08* (2013.01); *G06F 3/013* (2013.01); *G06T 7/13* (2017.01); *G06V 10/141* (2022.01); *G06V 10/25* (2022.01); *H04N 23/71* (2023.01); G06T 2207/10048 (2013.01)

(58) Field of Classification Search
CPC ........ H04N 23/72; H04N 23/71; G01S 17/08; G06F 3/013; G06T 7/13; G06T 2207/10048; G06V 10/141; G06V 10/25; G02B 27/0093; G02B 27/017; G02B 23/10; G02B 23/105; G02B 23/12
See application file for complete search history.

(56) References Cited

U.S. PATENT DOCUMENTS

| | | | |
|---|---|---|---|
| 6,798,578 B1 * | 9/2004 | Beystrum | H04N 5/33 345/9 |
| 8,710,415 B2 | 4/2014 | Peyras | |
| 9,030,600 B2 | 5/2015 | Gao | |
| 10,447,942 B1 | 10/2019 | Shaick | |

(Continued)

OTHER PUBLICATIONS

European Search Report received for EP Patent Application No. 23161876.0, dated Sep. 15, 2023, 9 pages.

*Primary Examiner* — Luong T Nguyen
(74) *Attorney, Agent, or Firm* — Workman Nydegger

(57) ABSTRACT

A nightvision system includes an underlying device that provides output light in a first spectrum. A transparent optical device transmits light in the first spectrum from the underlying device through the transparent optical device. The transparent optical device includes an active area of a semiconductor chip. The active area includes active elements that cause the underlying device to detect light from the underlying device and transparent regions formed in the active area which are transparent to the light in the first spectrum to allow light in the first spectrum to pass through from the underlying device to a user. An image processor processes brightness maps produced using light detected by the first plurality of active elements. An illuminator coupled to the image processor inputs light into the underlying device based on image processing performed by the image processor.

20 Claims, 7 Drawing Sheets

(56) References Cited

U.S. PATENT DOCUMENTS

| | | |
|---|---|---|
| 2016/0006914 A1 | 1/2016 | Neumann |
| 2018/0184053 A1* | 6/2018 | Engelen |
| 2020/0074603 A1* | 3/2020 | Vollmerhausen ......... G06T 5/20 |
| 2020/0400944 A1* | 12/2020 | Burnsed ................. H04N 23/45 |
| 2021/0349301 A1 | 11/2021 | Becker et al. |
| 2021/0382303 A1 | 12/2021 | Burnsed et al. |
| 2023/0101352 A1* | 3/2023 | LeBeau ................ H04N 23/671 |
| | | 348/217.1 |

* cited by examiner

SMART ILLUMINATION FOR NIGHTVISION USING SEMI-TRANSPARENT DETECTOR ARRAY

BACKGROUND

Background and Relevant Art

Nightvision systems allow a user to see in low-light environments without external human visible illumination. This allows for covert vision in a low-light environment to prevent flooding the environment with human visible light and/or protects the user from being detected due to causing human visible light or light that is otherwise detectable to other nightvision systems to be emitted.

Some nightvision systems function by receiving low levels of light reflected off of, or emitted from objects and providing that light to an image intensifier (sometimes referred to as $I^2$). The image intensifier has a photocathode. When photons strike the photocathode, electrons are emitted into a vacuum tube, and directed towards a microchannel plate to amplify the electrons. The amplified electrons strike a phosphor screen. The phosphor screen is typically chosen such that it emits human visible light when the amplified electrons strike the phosphor screen. The phosphor screen light emission is coupled, typically through an inverting fiber-optic, to an eyepiece where the user can directly view the illuminated phosphor screen, thus allowing the user to see the objects.

Typical nightvision systems suffer from various lighting issues. For example, in some environments, there is not sufficient ambient lighting (such as light from the moon, stars, or other sources) to allow acceptable viewing of a scene using the nightvision system. Thus, often, external illuminators are used to add additional lighting. Typically, these illuminators emit infrared (IR) light that is not visible to a human user's naked eye, but is detectable by the nightvision system. However, these illuminators tend to emit a constant, set amount of light which can cause various issues in certain environments and scenarios. For example, a user moving from an outdoor environment to an indoor environment can result in a situation where the illuminator causes an unusually high amount of light to be captured by the nightvision system, which causes the scene in its entirety to be washed out. Alternatively, certain important portions of a scene may be washed out.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a nightvision system. The nightvision system includes an underlying device that is configured to provide output light in a first spectrum from input light received at the underlying device. A transparent optical device is optically coupled in an overlapping fashion to the underlying device. The transparent optical device is configured to transmit light in the first spectrum from the underlying device through the transparent optical device. The transparent optical device includes an active area of a semiconductor chip. The active area includes active elements configured to cause the underlying device to detect light from the underlying device and transparent regions formed in the active area which are transparent to the light in the first spectrum to allow light in the first spectrum to pass through from the underlying device to a user. The transparent regions are configured in size and shape to cause the transparent optical device to have a first transmission efficiency for light in the first spectrum. An image processor configured to process brightness maps produced using light detected by the first plurality of active elements is coupled to the transparent optical device. An illuminator is coupled to the image processor. The illuminator is configured to provide additional input light into the underlying device based on image processing performed by the image processor.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein are directed to using a transparent optical device in conjunction with nightvision equipment, such as an image intensifier (or other nightvision system). The transparent optical device includes light detection functionality that is able to detect brightness maps by detecting light produced by the nightvision equipment. Further, the transparent optical device is transparent to light produced by the nightvision equipment to allow light produced by the nightvision equipment to be transmitted to a user. Using the detected brightness map, embodiments can perform illumination functionality. In some embodiments, illumination functionality may be aided by using features such as object edge detection, object recognition, identifying regions of interest, etc. in a brightness map. In particular, automatic illumination functionality can be performed to improve contrast, and/or based on various items detected by the transparent optical device. Note that in some embodiments, the transparent optical device may further include display functionality for overlaying additional information on an image produced by the nightvision equipment.

Figure 1:
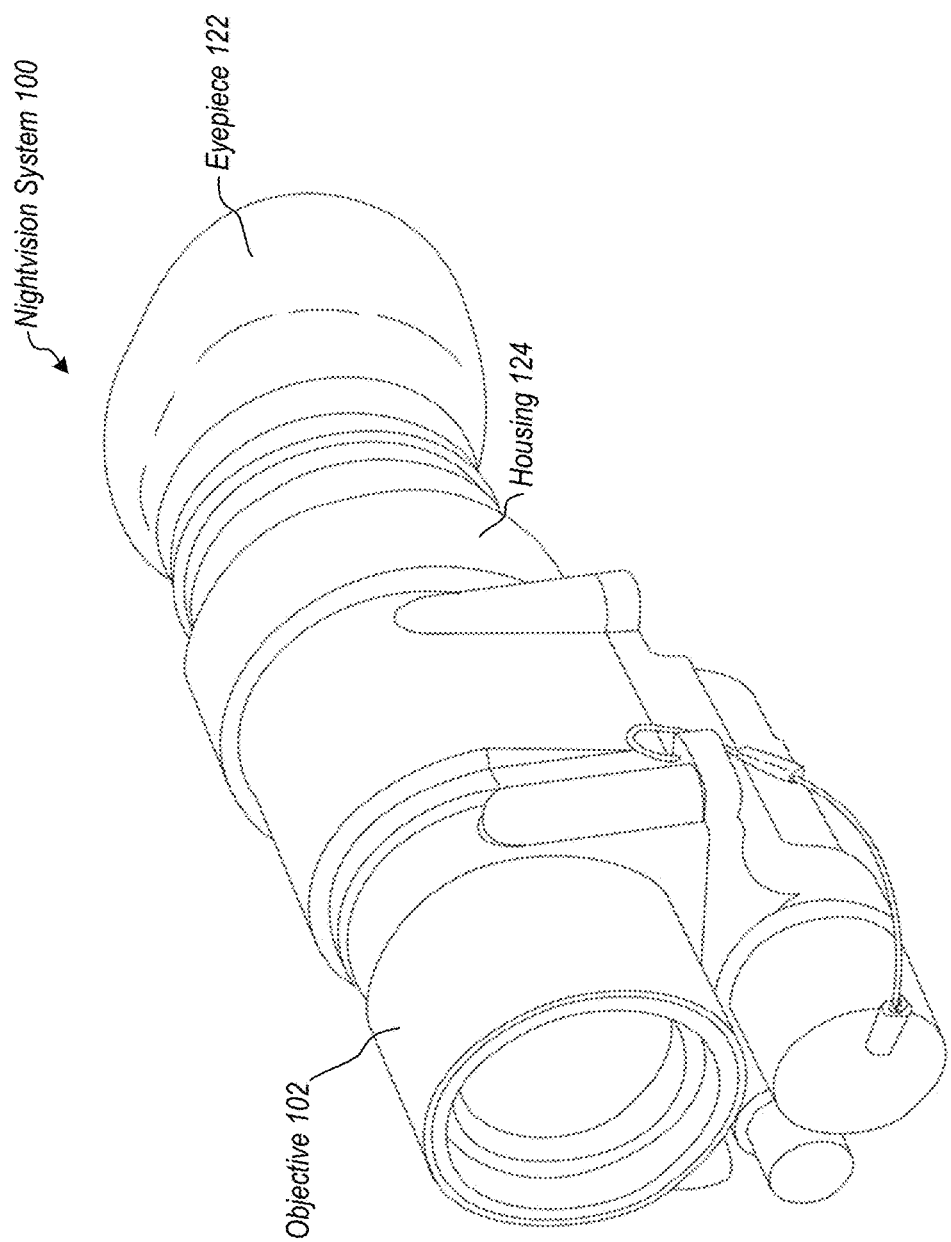
FIG. 1 illustrates a nightvision system.

Additional details are illustrated. Attention is now directed to FIG. 1, where a specific example of a nightvision system is illustrated. In particular, FIG. 1 illustrates the PVS-14 nightvision system 100. In the example illustrated, the nightvision system 100 includes a housing 124. As will be illustrated in more detail below in other figures, the housing 124 houses an image intensifier, a transparent optical device (see e.g., FIGS. 3A, 3B and 3C and transparent optical device 118), and various other components. The nightvision system 100 further includes an objective 102 which receives weak light reflected and/or generated in an environment. The objective 102 includes optics such as lenses, waveguides, and/or other optical components for receiving and transmitting light to an image intensifier, discussed in more detail below. The nightvision system 100 further includes an eyepiece 122. The eyepiece 122 includes optics for focusing images created by the nightvision system 100, including images created by an image intensifier and images created by a transparent optical device, into the eye of the user.

Figure 2:
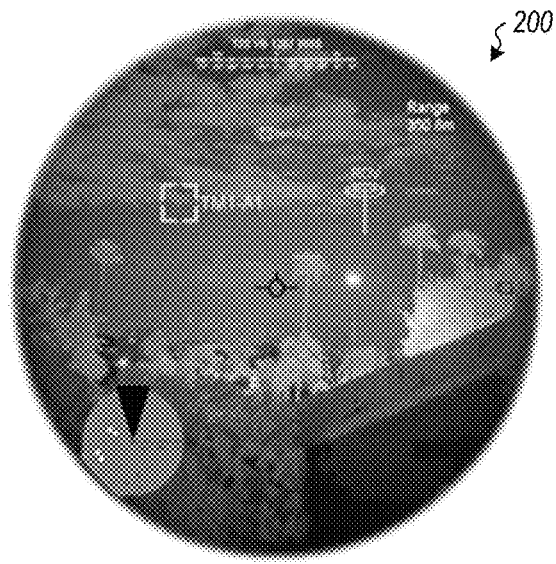
FIG. 2 illustrates a nightvision scene image with heads-up display functionality.

As discussed above, and with reference to FIG. 2, modern ancillary functionality can be added to existing nightvision systems. FIG. 2 illustrates an image 200 including a heads-up display displayed on a nightvision image output from an intensifier tube. Some embodiments described herein are directed to implementing a heads-up display implemented by adding image overlay capabilities with a nightvision system, where the image overlay capabilities are added by using a transparent optical device including a display.

The heads-up display may display to the user, in or around the field-of-view of an environment, various pieces of information to create an augmented reality (AR) environment. Such information may include, for example, a navigational heading, the speed at which the user is moving, coordinates, communication messages (such as email, SMS, etc.), time of day or other timing information, vital signs for the user such as heart rate or respiration rate, indicators indicating whether an object being viewed by the nightvision system is friendly or adversarial, battery charge level for the nightvision system or other devices, weather conditions, contact information, audio information (such as volume, playlist information, artist, etc.), etc. In some embodiments, the heads-up display can superimpose thermal image data over intensified light images. In particular, a nightvision system 100 may include (or at least have access to data from) thermal cameras for detecting thermal characteristics in an environment. Data from thermal cameras can be used to control the transparent optical device 118 to display thermal imaging data, correlated with artifacts in intensified light images, to the user. For example, various colors can be used to represent various temperatures where the colors are output by the transparent optical device 118 to the user. The colors are overlaid on intensified light image artifacts to indicate temperature of objects in an environment. Note that the transparent optical device 118 (or other elements) includes photodetectors for detecting intensified light to determine brightness in a scent, the locations of various objects in the field of view, or other information. This information can be used for illumination functionality as described above and in more detail below, correlating thermal colors, target indicators, or other images output by the transparent optical device 118.

Figure 3A:
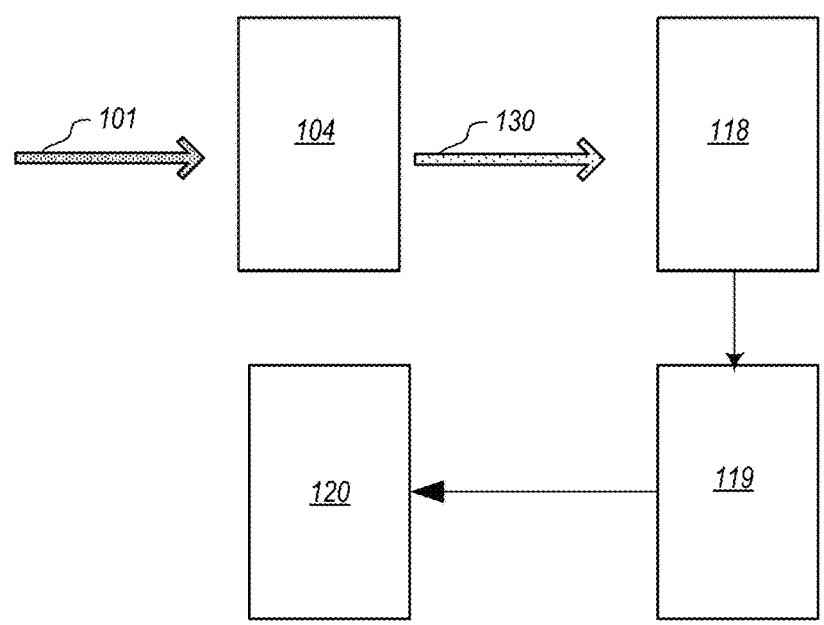
FIG. 3A illustrates a block diagram of an underlying device, transparent optical device, image processor, and an illuminator.
Figure 3B:
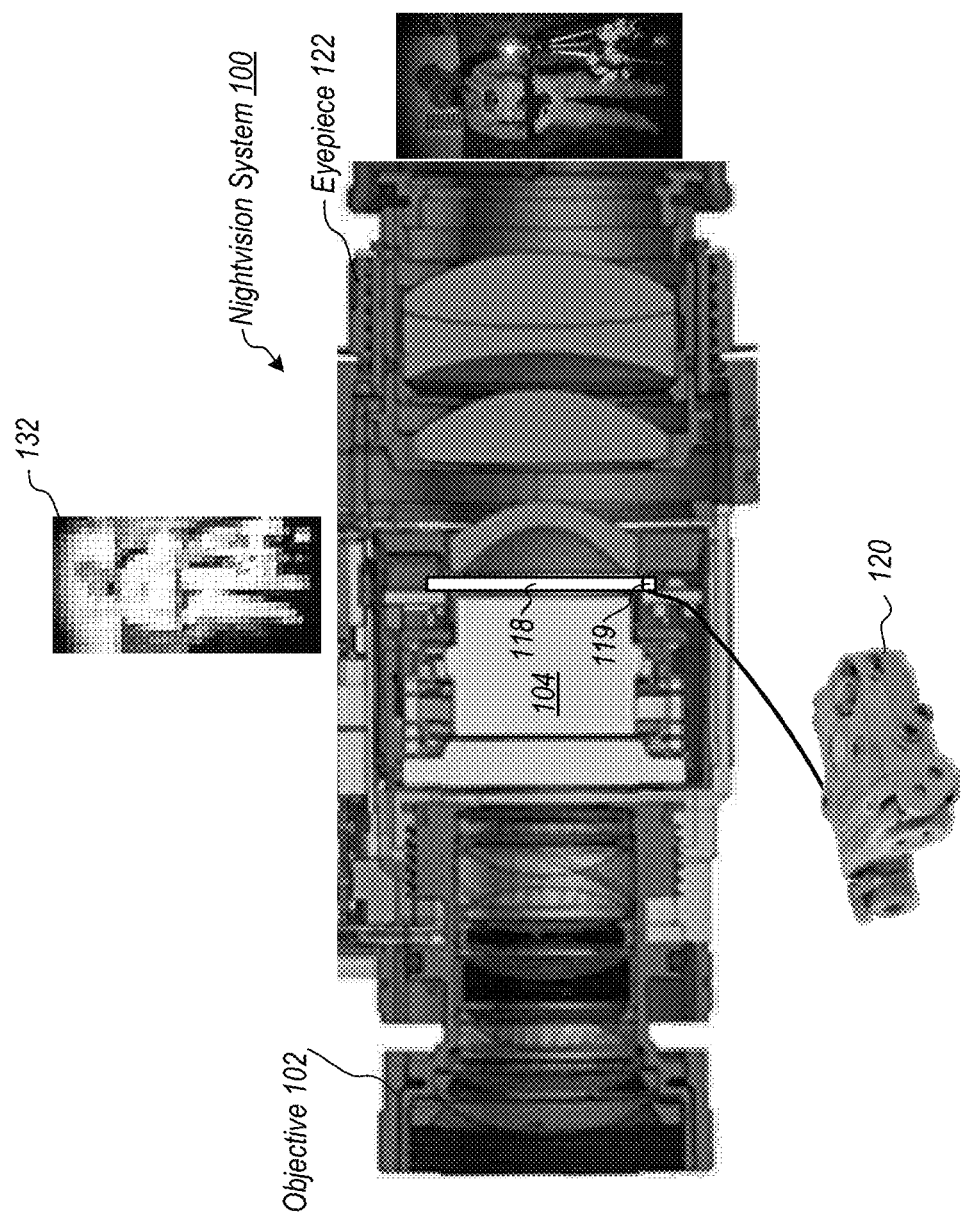
FIG. 3B illustrates a cutaway diagram of components of a nightvision system coupled to an illuminator.
Figure 3C:
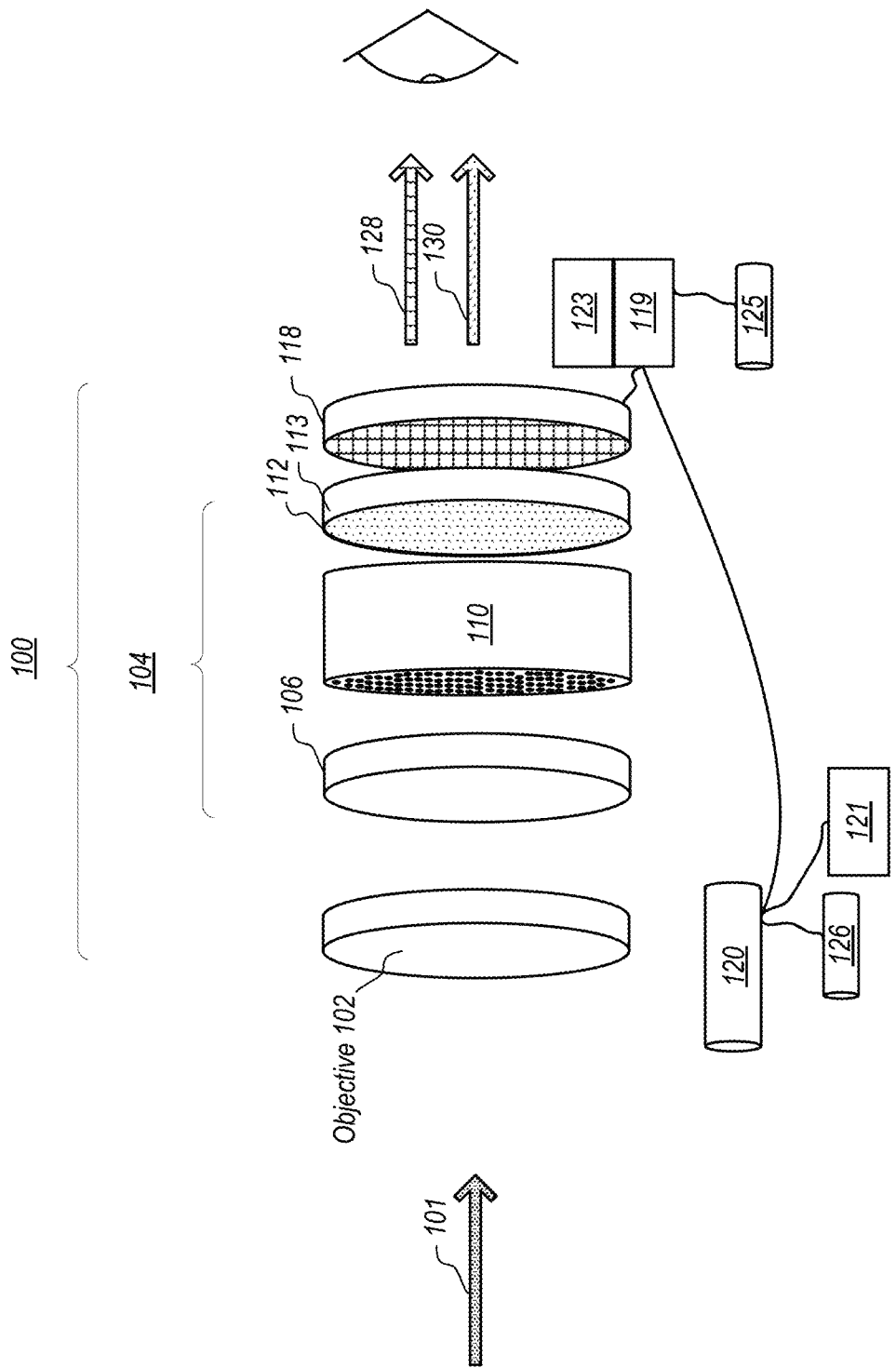
FIG. 3C illustrates a block diagram of components of a nightvision system, where an underlying device is an image intensifier, and an illuminator.

Attention is now directed to FIGS. 3A, 3B and 3C. FIGS. 3A, 3B and 3C illustrate a block diagram, a cutaway and a block diagram respectively of embodiments of the invention. A nightvision system typically includes an objective 102 to focus input light 101 into an underlying device 104. It should be appreciated that in various embodiments, the underlying device 104 may be one or more of a number of different types of nightvision devices, such as IR CCD cameras, CMOS cameras, image intensifiers, and the like. In the example illustrated in FIG. 3C, the underlying device 104 is an image intensifier. Input light 101 may be, for example, from ambient sources, such as light from heavenly bodies such as stars, the moon, or even faint light from the setting sun. Additionally, or alternatively, ambient sources could include light from buildings, automobiles, or other faint sources of light that cause reflection of light from an object being viewed in a nightvision environment into the objective. A second source of light may be light being emitted from an external source, such as the illuminator 120, towards an object, reflected off the object, and into the objective. For example, the source may be an infrared source that is not viewable in the viewable spectrum for human observers. A third source of light may be light emitted by an object itself. For example, this may be related to infrared heat energy emitted by the object and directed into the objective. Nonetheless, the nightvision system is able to convert the light emitted from the source into a viewable image for the user.

The objective directs any input light 101 into the underlying device 104. Note that the underlying device 104 may include functionality for amplifying light received from the objective to create a sufficiently strong image that can be viewed by the user. This may be accomplished using various technologies, in the image intensifier example of FIG. 3C, such as a photocathode 106, a microchannel plate 110, and a phosphor screen 112. The photocathode 106 may be configured to generate photo electrons in response to incoming photons. Electrons from the photocathode 106 are emitted into the microchannel plate 110. Electrons are multiplied in the microchannel plate 110.

Electrons are emitted from the microchannel plate 110 to a phosphor screen 112 which glows as a result of electrons striking the phosphor screen 112. This creates a monochrome image from the input light 101.

A fiber-optic 113 carries this image as intensified light to the eyepiece (such as eyepiece 122 illustrated in FIG. 1) of a nightvision system where it can be output to the user. This fiber-optic 113 can be twisted 180 degrees to undo the inversion caused by the system objective to allow for convenient direct viewing of the screen.

FIGS. 3A, 3B and 3C further illustrate the transparent optical device 118. The transparent optical device 118 allows intensified light to pass through the transparent optical device 118, but also, in some embodiments, generates its own light, from LEDs or other light emitters, to transmit to a user. Creating a transparent optical device may be accomplished, for example, using the teachings of U.S. patent application Ser. No. 16/868,306, filed on May 6, 2020, titled "Backside Etch Process For Transparent Silicon Oxide Technology", which is incorporated herein by reference, in its entirety.

The transparent optical device 118 is typically implemented behind the fiber-optic 113 (i.e., closer to the eyepiece than the fiber-optic 113), but in other embodiments may be implemented in front of the fiber-optic 113. The use of a fiber-optic within nightvision systems inverts and translates the focal plane allowing the transparent optical device 118 overlay to be presented on either side without impacting the ability for the eyepiece to focus on the image. However, certain manufacturing or mechanical constraints may incentivize placement of the transparent optical device 118 behind the fiber-optic including the difficulty in inserting electronics within the vacuum package. Placing the transparent optical device 118 external to the fiber-optic can be done to allow the transparent optical device 118 to be applied after the image intensifier tube has been manufactured and sealed, lowering production difficulties. As discussed above, the transparent optical device 118 may include functionality for displaying information to a user. Such information may include graphical content, including text, images, and the like. In some embodiments, the transparent optical device 118 may display in shaded monochrome. Alternatively, or additionally, the transparent optical device 118 may display in multiple colors. Alternatively, or additionally, the transparent optical device 118 may display in 1-bit monochrome.

In the example illustrated in FIGS. 3A, 3B and 3C, the transparent optical device 118 outputs display light 128 which can be sent to the eyepiece (such as the eyepiece 122 illustrated in FIG. 1). As noted previously, the intensified light 130 is also provided to the eyepiece. Thus, an image such as that illustrated in FIG. 2 is presented to the user in the nightvision system.

As noted previously, the transparent optical device 118 is composed of active silicon elements, typically in a grid arrangement to implement various pixels. The active elements cause the device to have certain optical performance capabilities. Such capabilities may be one or more of abilities to output color output, output monochrome output, detect light, have a certain pixel density, have a certain pitch, etc. In particular, the transparent optical device 118 is a digital detector and potentially display having a certain pixel density for the detector and potentially a display. Often, each pixel is implemented on a single active island, although in other embodiments, an island may have multiple pixels, or even only a single sub-pixel element. Each pixel may have one or more transistors controlling one or more OLED emitters (or other light emitting devices). Pixels may additionally or alternatively include light detectors. This can be useful for detecting the intensified light from the phosphor screen 112 or other optical output when other underlying devices are used. This detected light can be used for illumination functionality and/or to characterize an image intensifier image. For example, the detected light can be used for recording scene events. Alternatively or additionally, the detected light can be used for improving placement of elements displayed on the heads-up display shown in FIG. 2. For example, edge detection techniques may be used using the detected light, and images generated and displayed by the transparent optical device 118 can be keyed off of these detected edges. Edge detection techniques may be used using the detected light, and control of the illuminator 120 can be keyed off of these detected edges. Note that as will be discussed in more detail below in conjunction with the description of FIG. 4, in some embodiments, multiple illuminators may be controlled. Indeed, in some embodiments the illuminators may be networked for mutual control to achieve certain desirable illumination characteristics.

In any case, the transparent optical device 118 is representative of a stacked device formed in a semiconductor chip that overlaps an underlying device 104, in the case shown in FIG. 3C, the underlying device 104 is an image intensifier. The transparent optical device 118 is transparent to light in a first spectrum (according to some predefined transmission efficiency), which in this case is the visible spectrum of light output by the phosphor screen 112. That is, the transparent optical device 118 is not fully transparent due to the blocking of the active devices, but transparency referred to herein refers to at least partial transparency according to some transmission efficiency. Note that overlapping as used herein means that elements are in the same optical path. This can be accomplished by having elements be in coaxial alignment when the optical path is straight. Alternatively, this can be accomplished by using various waveguides or other elements to align optical paths thus not requiring physical coaxial alignment.

A photodetector implemented in the transparent optical device absorbs a portion of the intensified light converting it to an electrical signal. For example, the photodetector can be a two-dimensional array of light detectors, such as photodiodes, that generates a charge current, or any other form of digital data level proportional to intensity of the intensified light as a function of position. Accordingly, the photodetector may generate a two-dimensional array of electrical charge that represents the intensified image. In some embodiments, this two-dimensional array of electrical charge can be periodically read from the photodetector (e.g., the detected signal can be read from the photodetector like in a charged coupled device (CCD) camera). In some embodiments, the two-dimensional array of electrical signals from the photodetector is processed (such as by the image processor 119) and/or used locally, e.g., within the transparent optical device 118, at the readout or pixel levels, to modulate in real time the amplitude of the display light 128 emitted from the transparent optical device 118.

Figure 5:
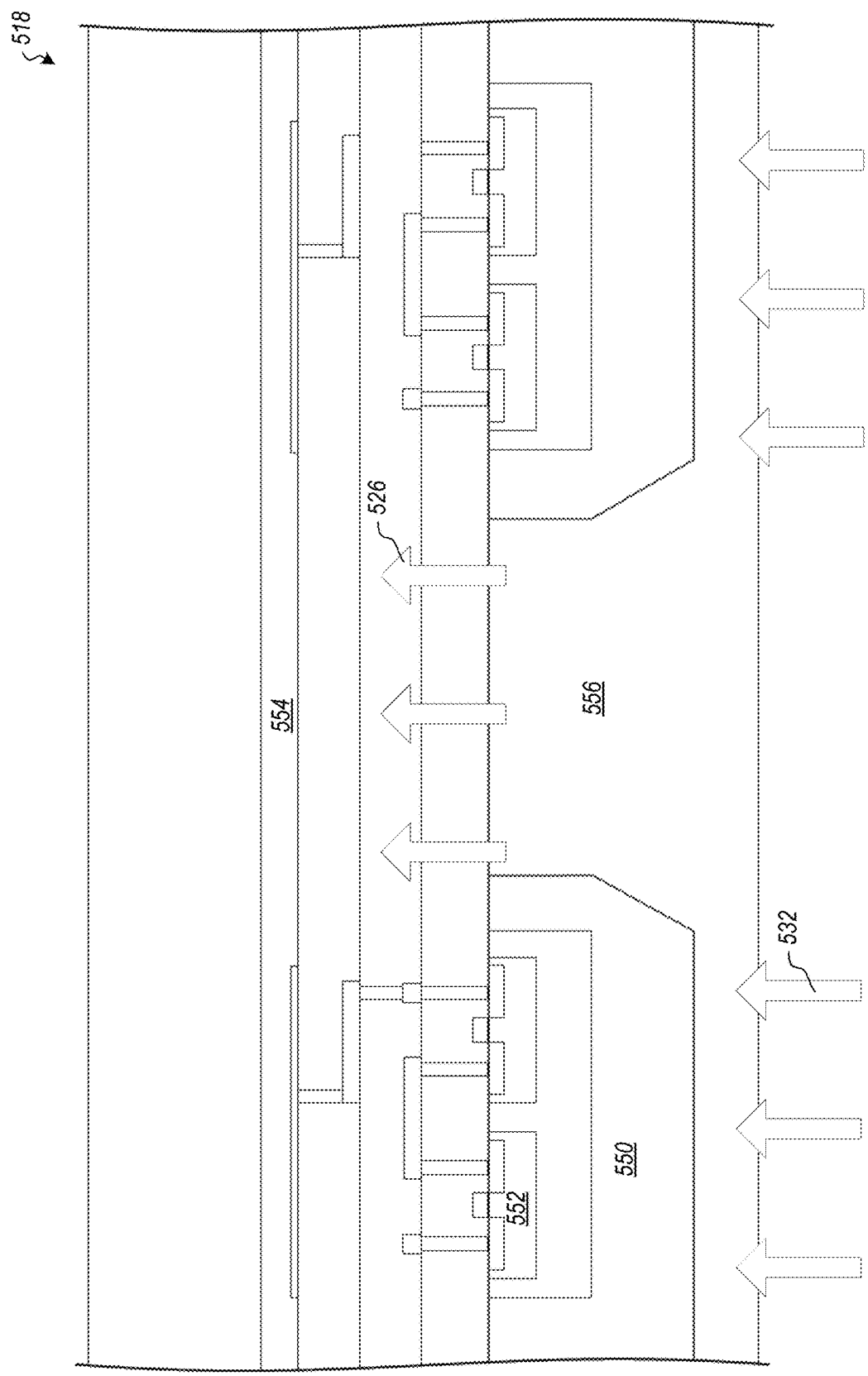
FIG. 5 illustrates a transparent display structure cross-section view, including transparent regions.

The transparent regions shown in the preceding figures can be created in a number of particular ways. In some embodiments, the transparent regions can be created by using the processes described in U.S. patent application Ser. No. 16/686,306 titled "Backside Etch Process For Transparent Silicon Oxide Technology", which is incorporated herein by reference in its entirety. Briefly, that application describes a process for creating transparent regions in otherwise opaque portions of semiconductor materials. For example, reference is now made to FIG. 5 which illustrates a transparent optical device 518 including active silicon islands (which may be native silicon islands) such as active silicon island 550. In particular, active silicon islands include transistors such as transistor 552 which control detectors and potentially OLED emitters in an OLED stack 554. In the example illustrated in FIG. 5, each of the active silicon islands represents a pixel or sub-pixel of the transparent optical device 518. Thus, an image can be detected by active elements in the active region. Additionally, in some embodiments, by illuminating various LEDs in the OLED stack 554 using the transistors in the active silicon islands, an image can be created and output to a user, such as by outputting display light such as the display light 128 illustrated in FIG. 3B.

As illustrated in FIG. 3B, intensified light is transmitted through the transparent optical device 118 to the eyepiece of the nightvision system, and then to the user. Note, however, that the intensified light is transmitted to the user through the transparent optical device 118, meaning that the intensified light will be affected by characteristics of the transparent optical device 118. In the example illustrated in FIG. 3B, light 128 represents the light output by the light emitting portions of the transparent optical device 118. Light 130 represents intensified light from the phosphor screen 112 transmitted through the transparent optical device 118. That is, light 130 may include or may be, in its entirety, light in the first spectrum.

Referring once again to FIG. 5, light 526 represents a portion of light that is transmitted through transparent regions, illustrated by transparent region 556, of the transparent optical device 518, while light 532 represents a portion of light that is blocked by active portions of the transparent optical device 518. Note that in some embodiments, the transparent region 556 is backfilled with a transparent back fill material.

However, transmission of light through the transparent optical device is nonetheless increased by removing portions of silicon that are not needed for implementing active electrical components or for supporting metal traces. For example, consider an example where dynamic pixel cells are used. In this particular example, assume that there are two sub pixels per pixel. Anode size for the sub pixels is 8 µm×5.1 µm. Pixel area is 10.1 µm×12.4 µm. Pixel pitch is 22.5 µm×22.5 µm. In one example, this provides a resolution of 800×800. In this particular transparent optical device, if non-active silicon islands (not shown) that are typically implemented are not removed, transparency of the transparent optical device is about 33%. In contrast, transparency is about 61% if the non-active silicon islands are removed such as in the structure illustrated in FIG. 5. Thus, in this example, transparency of a transparent optical device is increased by more than 80% by removing silicon and/or oxide trenches.

Note that various engineering trade-offs can be made to meet certain requirements. For example, increased transparency can be obtained by having a lower resolution and/or using fewer sub pixels as there is more space between pixels and/or sub pixels. If a higher resolution is needed, then that transparent optical device will have a lower transparency than an equivalently sized transparent optical device with a lower resolution. Thus, for example, a transparent optical device with a 36 µm pitch can obtain a transparency of 81%, while a transparent optical device of 22.5 µm pitch can obtain a transparency of 67%, while a transparent optical device having a 17.5 µm pitch will be about 55% transparency when non-active silicon islands are removed from the transparent optical device in each of the illustrated examples. Thus, some embodiments may be able to create a transparent optical device with at least a 36 µm pitch with at least a transparency of 75%, or a transparent optical device of at least a 22.5 µm pitch with at least a transparency of 60%, or a transparent optical device having at least a 17.5 µm pitch with at least a 50% transparency when silicon is removed between active silicon islands. The preceding illustrates one specific example related to a particular manufacturing process.

Pitch and transparency values may be specific to a given semiconductor manufacturing process—also known as the technology or process node—and will of course vary as the node changes. Typically designating the process's minimum feature size, the technology node will dictate the area of required active silicon for the display CMOS based on the transistor size. As the node minimum feature size decreases, whether it be through alternate foundries or improvements in technology, the same need for maximizing transparency applies. Indeed, the benefit to removing non-active silicon islands improves as the ratio of inactive- to active-silicon increases with smaller transistors.

The example numbers described herein are derived assuming a 180 nm technology/process node, although similar calculations can be performed for any specific technology size.

In the example illustrated in FIG. 3C, light 101 is input into the objective 102, where it is transmitted to an underlying device 104, in this case, an image intensifier. FIGS. 3A, 3B and 3C further illustrate the transparent optical device 118. As noted previously, the transparent optical device 118 includes light detectors that are able to detect light produced by the underlying device 104 to produce a brightness map 132. The brightness map 132 indicates different light levels in different portions of a scene. In particular, analysis of the brightness map can show variations in brightness of a scene detected by the underlying device 104. FIGS. 3A, 3B and 3C further illustrate an image processor 119. The image processor 119 is able to process brightness maps produced by the detectors in the transparent optical device 118. In particular, the image processor 119 can analyze and identify the brightness variations in the brightness map.

Figure 4:
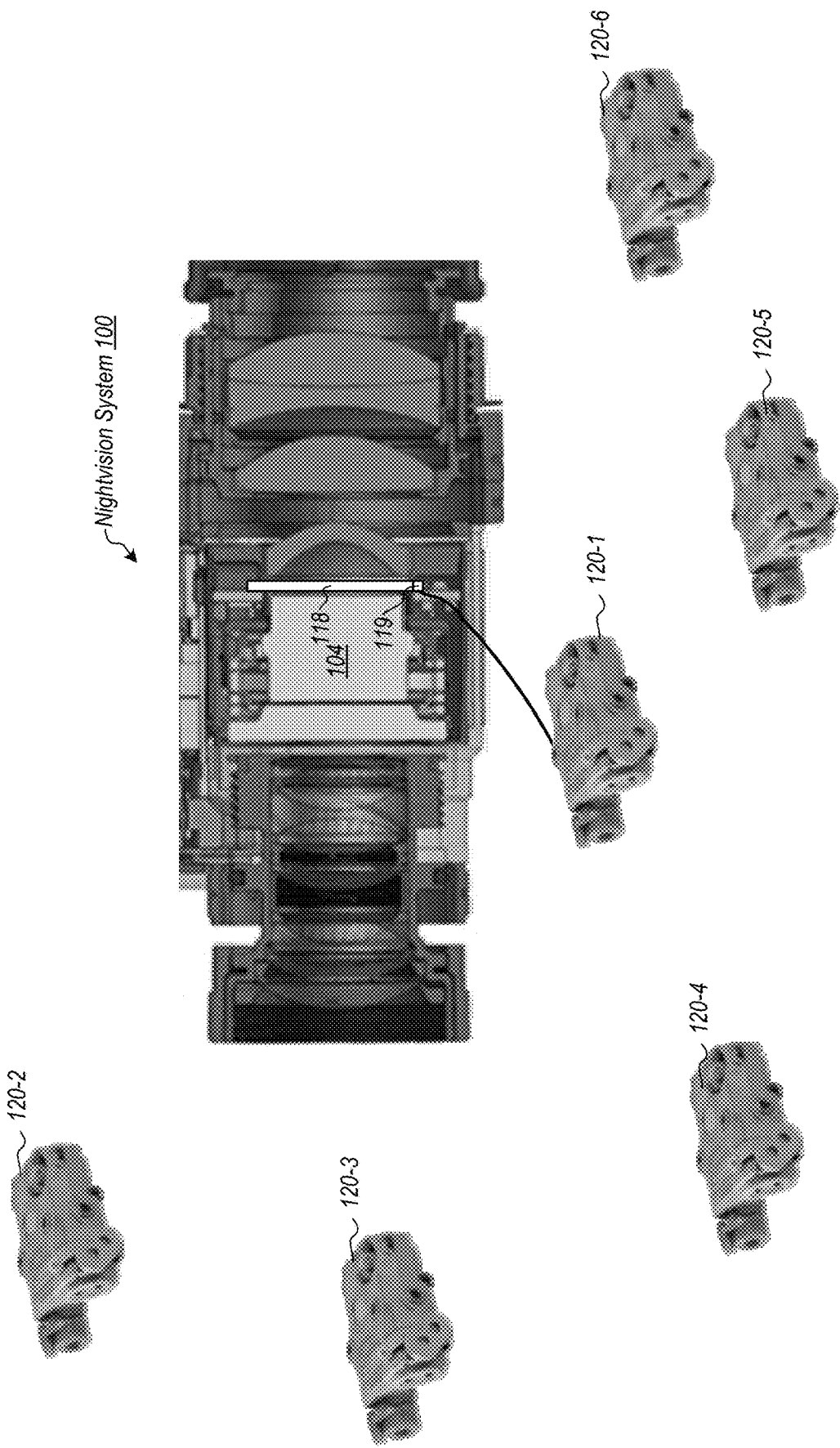
FIG. 4 illustrates a nightvision system coupled to a plurality of networked illuminators.

The image processor 119 is further connected to an illuminator 120. The illuminator 120 is configured to output light to provide additional input light (typically by reflecting that light off of objects in a scene) into the underlying device 104 based on the image processing. Typically, the illuminator 120 emits light in a wavelength that is not visible to a human user with the naked eye. For example, the illuminator 120 may be an infrared illuminator that is visible to the nightvision system 100, but that is not visible to the human user with the naked eye. The illuminator 120 may be caused to provide additional light based on the processing. Alternatively, the illuminator may be caused to provide less light based on the processing. Alternatively, or additionally, the illuminator may be caused to provide a particular selectable pattern of light based on the processing. Alternatively, or additionally, the illuminator may be controlled as part of controlling a plurality of illuminators to achieve a particular illumination pattern, such as is illustrated in FIG. 4.

In nightvision systems, the illuminator 120 may be implemented in a number of different fashions. For example, the illuminator 120 may be implemented as a device mounted to a head mounted nightvision goggle. Alternatively, the illuminator 120 may be mounted on a helmet proximate the nightvision system 100. In some embodiments, both the nightvision system 100 and the illuminator 120 may be helmet mounted. Alternatively, in some embodiments, the illuminator may be mounted on an implement being used by the user of the nightvision system 100. For example, the user may have a handheld flashlight having the illuminator 120 therein. Alternatively or additionally, the user may have another implement such as a test meter, electronic drill, electronic screw driver, weapon, etc., having a controllable illuminator mounted thereon.

In an alternative embodiment the illuminator 120 may be included in a vehicle, such as included in headlights. That is, a vehicle may include IR headlights that are controllable by an image processor 119 in the user nightvision system 100.

In an alternative embodiment the illuminator 120 may be included in a range finder, such as a laser range finder device configured to identify distances of objects from the range finder (such as the ranging sensor 126).

Various different mechanisms may be implemented to allow the image processor 119 to communication with illuminator 120. For example, the image processor 119 may include, or be connected to wireless communication equipment where the illuminator 120 also includes corresponding wireless communication equipment, such as radios, antennas, amplifiers, etc. Alternatively, various wired connections may be implemented to communicate control information to the illuminator 120. Note that in some embodiments, certain smart mounting equipment, such as smart picatinny rails or other mounting equipment may include communication equipment or other equipment to facilitate functionality of an illuminator 120 or nightvision system 100 mounted thereto.

Note that as illustrated in FIG. 4, some embodiments may be implemented in a network of nightvision systems and illuminators. For example, FIG. 4 illustrates a plurality of illuminators 120-1 through 120-6. Note that while a plurality of illuminators is illustrated, in other embodiments, a plurality of nightvision systems and corresponding transparent optical devices and image processors may be implemented. In some embodiments, the image processor 119 may be configured to control illuminators associated with other users and/or various static and/or mobile illuminators. Desired contrast can be achieved by controlling the plurality of illuminators 120-1-120-6 separately or in concert. This provides one method of enhancing illumination in certain locations, direction, power ranges, etc. Note that in some embodiments various image processors associated with various different nightvision systems can communicate as well. This allows for optimization techniques to be applied to ensure that one image processor controlling an illuminator does not interfere (above some predetermined threshold) with contrast and illumination operations being undertaken by a different image processor. Thus, using networked illuminators and/or networked image processors, embodiments can balance desired illumination changes with desired illuminator and/or contrast by other users.

Some embodiments may be implemented in a fashion to optimize dynamic range of an underlying device. In particular, devices tend to operate more consistently, more linearly, and/or with other dynamic range features in certain ranges of operation. This operating voltage can be selected in linear regions of operations and/or regions that provide the most dynamic range to allow for wider variations in exogenous light. The way an image intensifier power supply device adjusts operational voltages to result in ABC (auto brightness control), BSP (bright source protection), and auto gaiting has dynamic range ramifications. Illumination control is performed in concert with the intensifier power supply to optimize scene dynamic range. Thus, dynamic range optimization results from integration of illuminator control with image intensifier power supply control to apply optimal cathode, microchannel plate, and screen voltages.

Note that in some embodiments, the illuminator may be controllable to direct light in a particular direction and/or with a particular dispersion. This can be done, for example, to attempt to illuminate a specific object or specific region of interest. This control may be accomplished in one or more of a number of different fashions. For example, in some embodiments, digital micro mirror devices and/or digital light processing may be used to direct light to desired locations. Alternatively, other type of controllable mirror arrays, laser arrays, adjustable gratings, and/or the like may be used to direct light to desired locations.

Thus, embodiments include a nightvision system 100. The nightvision system 100 includes an underlying device 104.

For example, an image intensifier is an example of an underlying device. Note that other underlying devices may be used in addition or alternatively. For example, some embodiments may include infrared CCD based or other low light level digital sensor system. The underlying device 104 is configured to provide output light in a first spectrum from input light received at the underlying device 104. Thus, for example, the first spectrum may be light produced by the phosphor screen 112.

The nightvision system 100 includes a transparent optical device, such as transparent optical device 118, optically coupled in an overlapping fashion to the underlying device 104. The transparent optical device 118 is configured to transmit light in the first spectrum from the underlying device 104 through the transparent optical device 118. The transparent optical device 118 includes: an active area of a semiconductor chip.

The active area includes a plurality of active elements configured to cause the underlying device 104 to detect light from the underlying device 104. For example, as described above, light detectors integrated into a photodetector may be used to detect light from the underlying device 104.

The transparent optical device 118 further includes a plurality of transparent regions formed in the active area which are transparent to the light in the first spectrum to allow light in the first spectrum to pass through from the underlying device 104 to a user. The transparent regions are configured in size and shape to cause the transparent optical device 118 to have a particular transmission efficiency for light in the first spectrum.

The nightvision system further includes an image processor, such as image processor 119 coupled to the transparent optical device 118. The image processor is configured to process brightness maps, such as brightness map 132, produced using light detected by the plurality of active elements.

The nightvision system further includes an illuminator, such as illuminator 120, coupled to the image processor 119. The illuminator 120 is configured to output light into the underlying device 104 based on image processing performed by the image processor 119.

As noted previously, the nightvision system may be implemented where the underlying device 104 comprises an image intensifier.

In some embodiments, the nightvision system may be implemented where the illuminator is configured to output light into the underlying device 104 based on coarse illumination factors and/or fine illumination factors. In some such examples, the fine illumination factors are based on the image processing performed by the image processor. While the coarse illumination factors are based on other inputs or analysis. As used herein coarse and fine are relative terms used with respect to each other. That is, coarse illumination is more coarse (or generally performed in larger increments) than fine illumination and fine illumination is more fine (or generally performed in smaller increments) than coarse illumination. In some embodiments, this can mean that a coarse illumination is performed first to attempt to achieve an initial level of illumination/contrast while fine illumination is thereafter performed to fine tune the illumination operation.

For example, in some embodiments, the nightvision system may include an orientation sensor 121 coupled to the illuminator 120. In such examples, the coarse illumination factors are based on information received from the orientation sensor 121. Such orientation sensors may include one or more of accelerometers, gyroscopes, magnetometers, internal measurement units, combinations thereof, and the like. Coarse illumination functionality is performed as a result of detecting orientation information. This could be a change in orientation (e.g., a change of a certain number of degrees in one or more axis), satisfaction of a condition of absolute orientation, or combinations thereof.

Note that this type of coarse illumination may be useful when large differences in illumination of a scene is required. For example, consider a case where a user desires high illumination when scanning a horizon, but then looks down at handheld items, the ground, or their feet, where the user desires less illumination. Thus, some embodiments may include functionality for performing a coarse illumination function to illuminate using higher powered illumination for distance viewing than up-close viewing as a result of orientation information obtained from an orientation sensor.

In some embodiments, the nightvision system may include a ranging sensor 126. In some such examples, the coarse illumination factors are based on information received from the ranging sensor 126. The ranging sensor 126 can include elements such as lasers, lidar, radar, sonar, combinations thereof, or other ranging equipment. Thus, coarse illumination functionality can be performed as a result of detecting ranging information to control illumination of the illuminator 120 dependent on a distance of objects of interest.

Note that while in typical embodiments coarse and fine illumination functionality can be performed, it should be appreciated that in other embodiments, any of the illumination factors and mechanisms may be used individually or in combination. Thus, in some embodiments, illumination functionality is performed based on using the orientation sensor 121 without using information from the image processor 119. Alternatively, illumination functionality is performed based on using the ranging sensor 126 without using information from the image processor 119. Alternatively, illumination functionality is performed based on using the image processor 119 without using information from the orientation sensor 121 or the ranging sensor 126. Further, it should be appreciated that embodiments may use both the orientation sensor 121 and the ranging sensor 126 to perform coarse illumination functionality and then sequentially use information from the image processor 119 to perform fine illumination functionality.

The nightvision system may be implemented where the image processor performs edge detection. For example, such edge detection may be implemented using Sobel edge detection and/or Canny edge detection. In some such embodiments, the illuminator is configured to output light into the underlying device 104 based on the edge detection. Thus, for example, embodiments may be configured to provide illumination in an attempt to cause edges to have a particular characteristic as determined by the edge detection. For example, embodiments may be configured to cause the illuminator 120 to provide illumination to cause a certain contrast for a certain object in an environment. In some embodiments, overall scene contrast can be sacrificed to improve contrast on a particular object or region. Similar functionality may be performed for region detection and enhancing contrast for a particular region.

In some embodiments, the nightvision system may be implemented where the image processor performs object recognition. In some such embodiments, the illuminator is configured to output light into the underlying device 104 based on the object recognition. This can be implemented in a number of different fashions. For example, in some embodiments the nightvision system may be configured to perform illumination functionality for a largest object detected in a nightvision scene. Alternatively, embodiments may be configured to perform illumination functionality based on detection and classification of objects. For example, the image processor 119 may be able to identify that a certain object detected in a nightvision scene is likely a stop sign while a different object detected in the nightvision scene is likely a human. In this example, an algorithm may be implemented to cause the illuminator 120 to output light to enhance contrast for the object detected as a human while deprioritizing, and thus not enhancing, the object detected as a stop sign. Note that in some embodiments, the nightvision system 100 may include functionality for allowing user input to specify priorities when determining illumination functionality. For example, for specific missions, a user may wish to prioritize illumination functionality for objects classified as vehicles over objects classified as humans. Alternatively, a user may wish to prioritize illumination functionality for objects classified as animals over objects classified as humans. Thus, a user can specify priorities, and illumination functionality will be performed using the illuminator 120 on preferred objects recognized by the system.

Alternatively, or additionally, in some embodiments a user may be able to specify specific objects and not simply a classification of objects. For example, a user may be able to specify information to particularly identify a particular human based on height, weight, build, posture, or other characteristics. Thus, some embodiments may be able to specifically perform illumination functionality when the image processor 119 detects, within some acceptable probability, that a detected object can be classified as a specific object, such as a specific human. Similar functionality can be used for sub classifications of objects. For example, a user could specify illumination functionality should be prioritized for trucks whereas other vehicles such as cars, motorcycles, etc. are not prioritized as highly for illumination functionality.

The nightvision system 100 may be implemented where the image processor performs region of interest detection. In some such embodiments, the illuminator is configured to output light into the underlying device 104 based on the region of interest detection. These embodiments may be similar to the object detection embodiments above but focused on regions as opposed to specific objects.

The nightvision system 100 may be implemented where the nightvision system comprises an eye tracker 123 coupled to the image processor 119 to track a user's eye with respect to the processed brightness maps produced by the image processor. In some such embodiments, the illuminator 120 is configured to output light into the underlying device 104 based on tracking a user's eye with respect to the processed brightness maps produced by the image processor. In particular, embodiments can determine what objects a user is looking at in a nightvision scene using the eye tracker 123 and can perform illumination functionality for those objects based on that determination.

The nightvision system 100 may be implemented where the nightvision system 100 comprises an aiming laser 125 coupled to the image processor to facilitate aiming the nightvision system. In some such embodiments, the illuminator 120 is configured to output light into the underlying device 104 based on tracking the aiming laser 125 with respect to the processed brightness maps produced by the image processor 119.

In some embodiments the nightvision system 100 may be implemented where the illuminator is configured to provide information to a user to indicate to the user manual illumination adjustments that can be made with respect to providing additional input light into the underlying device 104. For example, as discussed previously, the transparent optical device 118, may include not only detector functionality, but may also include display functionality. Thus, using the display functionality, information may be output to the user to indicate to the user that manual adjustments should be performed to cause certain objects, regions, etc. to have a certain contrast for the user. In a similar embodiment, the display functionality may be able to highlight, such as by pointing to and/or outlining an object for which contrast is enhanced. A user can then select other objects to have contrast enhanced. Selection of these other objects can be performed by using a user interface to select the object in the nightvision scene, which can be used to cause the illuminator 120 automatically adjust illumination to enhance contrast for the selected object. Alternatively, or additionally, the user can simply perform a manual override to manually adjust illuminator illumination on a particular object based on information presented to the user using the display functionality of the transparent optical device 118.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
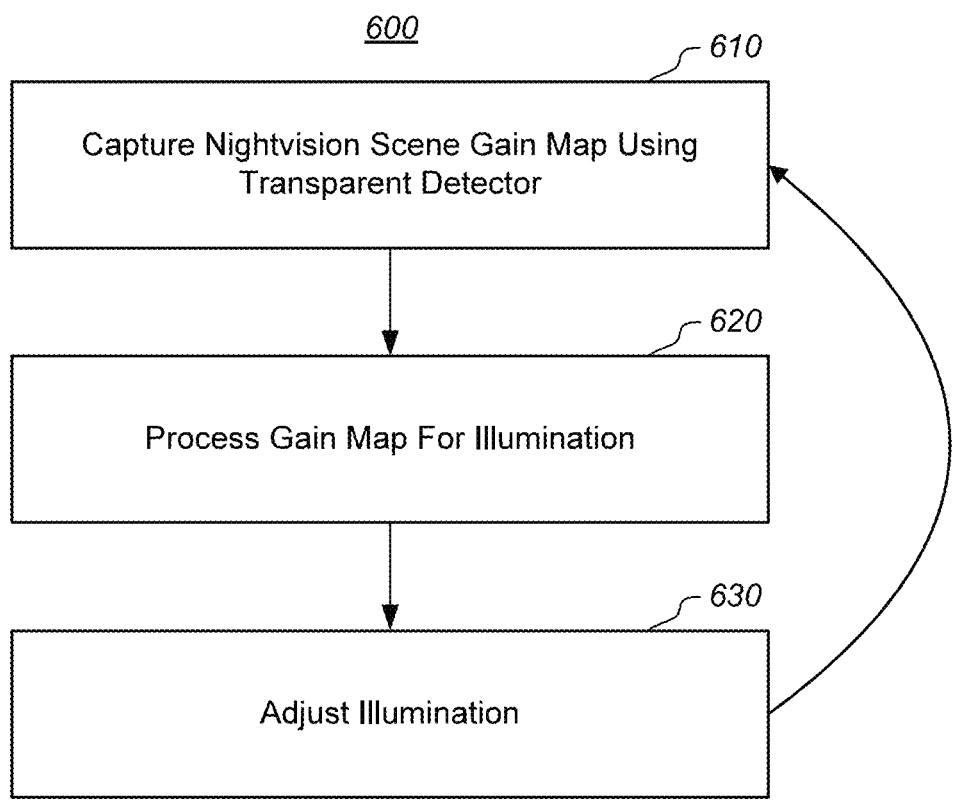
FIG. 6 illustrates a method of performing illumination functionality in a nightvision system using transparent optical devices.

Referring now to FIG. 6, a method 600 is illustrated. The method 600 includes capturing a nightvision scene image using a transparent detector (act 610). For example, the transparent optical device 118 may be used to capture a nightvision scene as described above. The method 600 includes processing a brightness map for illumination quality (act 620). For example, the image processor 119 can determine illumination quality (e.g., contrast) of the captured nightvision scene. The method 600 may further include adjusting illumination (act 630) based on the processing of act 620. Acts 610-630 can be repeated as needed to perform illumination functionality.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A nightvision system comprising:
    an underlying device, the underlying device configured to provide output light in a first spectrum from input light received at the underlying device;
    a transparent optical device optically coupled in an overlapping fashion to the underlying device, wherein the transparent optical device is configured to transmit the output light in the first spectrum from the underlying device through the transparent optical device, the transparent optical device comprising: an active area of a semiconductor chip, the active area comprising:
        a first plurality of active elements configured to cause the transparent optical device to detect the output light from the underlying device; and
        a first plurality of transparent regions formed in the active area which are transparent to the output light in the first spectrum to allow the output light in the first spectrum to pass through from the underlying device to a user, the first plurality of transparent regions being configured in size and shape to cause the transparent optical device to have a first transmission efficiency for the output light in the first spectrum;
    the nightvision system further comprising an image processor configured to process brightness maps, wherein the brightness maps indicate different light levels in different portions of a scene produced using the output light detected by the first plurality of active elements; and
    an illuminator coupled to the image processor, the illuminator configured to provide additional input light into the underlying device based on image processing performed by the image processor, wherein the illuminator is configured to provide the additional input light into the underlying device based the image processor performing dynamic range optimization for the underlying device to attempt to operate the underlying device in a predetermined target dynamic range.

2. The nightvision system of claim 1, wherein the underlying device comprises an image intensifier.

3. The nightvision system of claim 1, wherein the illuminator is configured to provide the additional input light into the underlying device based on coarse illumination factors and fine illumination factors wherein the fine illumination factors are based on the image processing performed by the image processor.

4. The nightvision system of claim 3, further comprising an orientation sensor, and wherein the coarse illumination factors are based on information received from the orientation sensor such that coarse illumination functionality is performed as a result of detecting orientation information.

5. The nightvision system of claim 3, further comprising a ranging sensor, and wherein the coarse illumination factors are based on information received from the ranging sensor ranging sensor such that coarse illumination functionality is performed as a result of detecting ranging information.

6. The nightvision system of claim 1, wherein the image processor performs edge detection, and wherein the illuminator is configured to provide the additional input light into the underlying device based on the edge detection.

7. The nightvision system of claim 1, wherein the image processor performs object recognition, and wherein the illuminator is configured to provide the additional input light into the underlying device based on the object recognition.

8. The nightvision system of claim 1, wherein the image processor performs region of interest detection, and wherein the illuminator is configured to provide the additional input light into the underlying device based on the region of interest detection.

9. The nightvision system of claim 1, wherein the nightvision system comprises an eye tracker coupled to the image processor to track a user's eye with respect to the processed brightness maps produced by the image processor, and wherein the illuminator is configured to provide the additional input light into the underlying device based on tracking a user's eye with respect to the processed brightness maps produced by the image processor.

10. The nightvision system of claim 1, wherein the nightvision system comprises an aiming laser coupled to the image processor to facilitate aiming the nightvision system, and wherein the illuminator is configured to provide the additional input light into the underlying device based on tracking the aiming laser with respect to the processed brightness maps produced by the image processor.

11. A method of performing illumination functionality in a nightvision system, the method comprising:
providing output light, from an underlying device, in a first spectrum from input light received at the underlying device;
transmitting the output light in the first spectrum through a transparent optical device optically coupled in an overlapping fashion to the underlying device, through an active area of a semiconductor chip, through a first plurality of transparent regions formed in the active area which are transparent to the output light in the first spectrum to allow the output light in the first spectrum to pass through from the underlying device to a user, the first plurality of transparent regions being configured in size and shape to cause the transparent optical device to have a first transmission efficiency for the output light in the first spectrum;
detecting the output light in the first spectrum to create a brightness map indicating different light levels in different portions of a scene from the underlying device using a first plurality of active elements configured in the active area;
processing the brightness map produced using the output light in the first spectrum detected by the first plurality of active elements at an image processor to perform region of interest detection; and
providing additional input light into the underlying device based on image processing performed by the image processor, including based on the region of interest detection, using an illuminator coupled to the image processor.

12. The method of claim 11, wherein the providing the additional input light into the underlying device using the illuminator is performed by the image processor performing dynamic range optimization for the underlying device to attempt to operate the underlying device in a predetermined target dynamic range.

13. The method of claim 11, wherein the providing the additional input light into the underlying device using the illuminator is performed by controlling a plurality of networked illuminators.

14. The method of claim 11, wherein the providing the additional input light into the underlying device using the illuminator is performed based on edge detection.

15. The method of claim 11, wherein the providing the additional input light into the underlying device using the illuminator is performed based on object recognition.

16. The method of claim 15, wherein the providing the additional input light into the underlying device using the illuminator is performed in a fashion computed by the image processor to enhance contrast for a particular detected object.

17. The method of claim 11, wherein the providing the additional input light into the underlying device using the illuminator is performed based on region detection in a fashion computed by the image processor to enhance contrast for a particular region.

18. The method of claim 11, wherein the illuminator is configured to provide information to a user to indicate to a user illumination adjustments that can be made with respect to providing the additional input light into the underlying device.

19. A method of manufacturing a nightvision system comprising:
coupling a transparent optical device optically, in an overlapping fashion, to an underlying device, the underlying device configured to provide output light in a first spectrum from input light received at the underlying device, wherein the transparent optical device is configured to transmit the output light in the first spectrum from the underlying device through the transparent optical device, the transparent optical device comprising: an active area of a semiconductor chip, the active area comprising:
a first plurality of active elements configured to cause the transparent optical device to detect the output light from the underlying device; and
a first plurality of transparent regions formed in the active area which are transparent to the output light in the first spectrum to allow the output light in the first spectrum to pass through from the underlying device to a user, the first plurality of transparent regions being configured in size and shape to cause the transparent optical device to have a first transmission efficiency for the output light in the first spectrum; and
coupling an image processor to the transparent optical device, the image processor configured to process brightness maps produced using the output light in the first spectrum detected by the first plurality of active elements;
coupling an illuminator to the image processor, the illuminator configured to output additional input light into the underlying device based on image processing performed by the image processor; and
coupling an eye tracker to the image processor to track a user's eye with respect to the processed brightness maps produced by the image processor, and wherein the outputting the additional input light into the underlying device is based on tracking a user's eye with respect to the processed brightness maps.

20. The method of claim 19, wherein the underlying device comprises an image intensifier.

* * * * *